United States Patent Office.

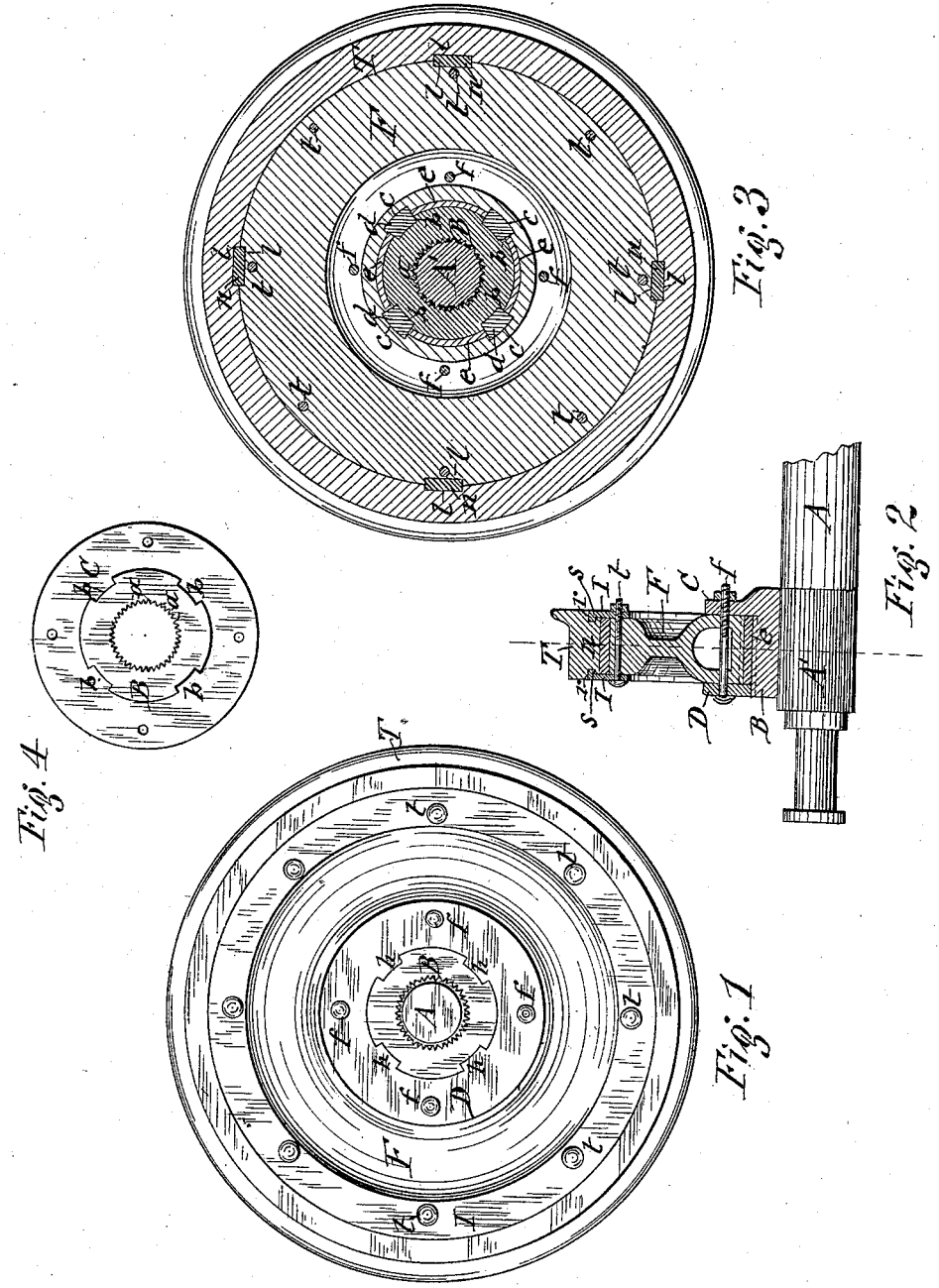

EDGAR PECKHAM, OF SYRACUSE, NEW YORK, ASSIGNOR, BY MESNE ASSIGNMENTS, TO THE PECKHAM CAR WHEEL COMPANY, OF NEW YORK.

CAR-WHEEL.

SPECIFICATION forming part of Letters Patent No. 366,183, dated July 5, 1887.

Application filed January 28, 1887. Serial No. 225,765. (No model.)

*To all whom it may concern:*

Be it known that I, EDGAR PECKHAM, of Syracuse, in the county of Onondaga, in the State of New York, have invented new and useful Improvements in Car-wheels, of which the following, taken in connection with the accompanying drawings, is a full, clear, and exact description.

This invention relates to the class of car-wheels which are composed of a hub, a body or web-section mounted detachably on the hub, and a separate tire secured to said body.

The object of my present invention is to effectually prevent the aforesaid component parts of the wheel from slipping circumferentially one upon the other, and thus guard against wear and abrasion of the bearings at the junctions of said parts, and the object is also to properly cushion the wheel, so as to protect it from the injurious effects of jars.

To that end the invention consists in the improved construction and combination of parts, as hereinafter fully described, and specifically set forth in the claims.

In the annexed drawings, Figure 1 is an outer face view of a car-wheel embodying my invention. Fig. 2 is a transverse section of one-half of the wheel. Fig. 3 is a section taken in a plane at right angles to the axis of the wheel; and Fig. 4 is a detached face view of the hub.

Similar letters of reference indicate corresponding parts.

A represents the car-axle, and B the hub of the car-wheel, which latter is to be rigidly secured to the axle so as to compel said parts to rotate synchronously and in unison. In order to insure this joint action and effectually guard against the slipping of the hub circumferentially on the axle, I fit said parts to each other by corresponding serrations or longitudinal corrugations on their respective bearing-surfaces. This I prefer to accomplish by making the wheel-bearing portions A' of the axle of greater diameter than the end portions of the axle, and providing the interior of the eyes of the wheel-hubs with fine sharp-edged longitudinal ribs *a a*, adapted to cut their ways on the axle portions A' during the process of pressing said wheel-hubs onto the axle. The hub B, I form with a circumferential rigid collar, C, on one end, and provide the hub with longitudinal grooves or key-seats *b b*, extending from the collar C to the opposite end of the hub.

F denotes the web-section or body of the wheel, which may be formed of either cast-iron or wrought-iron, or steel of any suitable and well-known shape. This body I provide with a central eye of somewhat greater diameter than that of the hub proper, upon which it is removably mounted. The interior of the eye of the body I provide with longitudinal grooves or key-seats *c c*, corresponding to the grooves or ways *b b* in the hub, and in said grooves *b c*, I insert keys *d d*, which I prefer to form of hard wood, thereby obtaining sectional cushions, which relieve the wheel from the injurious effect of jars and render the wheel noiseless. In the segmental portions of the eye of the body, between the keys *d d*, I insert bushings *e e*, which may be composed of either soft metal or paper or wood, so as to further cushion the wheel, for the purposes aforesaid. These keys and bushings are retained in their seats by the collar D, which is removably mounted on the end of the hub B, and covers the ends of said keys and bushings. Said collar is firmly clamped on the hub and against the side of the body F by bolts *f*, passing transversely through the collars C and D and intervening portion of the body. In order to compel the collar D to turn with the hub, I provide the eye of said collar with lugs *h h*, which project into the grooves *b b* of the hub.

T denotes the tire, which is usually shrunk onto the body F.

In view of the fact that the tires of car-wheels are liable to become expanded and work loose, so as to allow the tires to slip circumferentially on the body of the wheel, I guard against such accidents by providing the adjacent sides of the tire and car-body with coinciding key-seats *l l*, and insert therein closely-fitted keys *n n*, preferably of steel; and in order to obviate the danger of said keys working endwise out of their seats I clamp upon opposite sides of the body F annular plates I, which lap over the ends of the keys, and are secured in their positions by bolts *t t*, passing transversely through said plates and intervening portion of the body. By providing the sides of the tire with circumferential grooves r, and forming the plates I with flanges s, projecting from the outer peripheries of the plates into the aforesaid grooves, the tire is further locked on the body of the wheel, so as to prevent the tire from flying off in case it is broken.

Having described my invention, what I claim as new, and desire to secure by Letters Patent, is—

1. The combination of a car-wheel body and its tire provided with key-seats in their adjacent sides, keys inserted in said seats, annular plates on opposite sides of the body and lapping over the ends of the keys, and fastening-bolts passing through said plates and body, substantially as described and shown.

2. The combination of an axle and a wheel-hub fitted to said axle by serrations or longitudinal corrugations on the bearing-surfaces of said parts, substantially as and for the purpose set forth.

3. A car-wheel composed of a hub, having an annular external bearing concentric with the axis of the hub, a body mounted detachably on said bearing, key-seats on the adjacent sides of said bearing and body, and keys inserted in said seats, substantially as described and shown.

4. A car-wheel composed of a hub, having an annular external bearing concentric with the axis of the hub, a body detachably mounted on said bearing, key-seats in the adjacent sides of said bearing and body, keys inserted in said seats, and segmental bushings in the eye of the body between the aforesaid keys, substantially as described and shown.

5. In a car-wheel, the combination of the hub provided with a rigid collar on one end and with longitudinal key-seats extending from said collar to the opposite end of the hub, a body mounted on said hub and provided with corresponding key-seats, keys inserted in said seats, bushings in the eye of the body between the keys, and a collar clamped on the end of the hub and lapping over the ends of the keys, substantially as described and shown.

6. In a car-wheel, the combination of the hub provided with a rigid collar on one end and with longitudinal grooves extending from said collar to the opposite end of the hub, and provided with corresponding grooves, keys inserted in the aforesaid grooves, and a collar clamped on the end of the hub and provided with lugs entering the grooves of the hub to cover the ends of the keys and confine the said collar circumferentially on the hub, substantially as described and shown.

In testimony whereof I have hereunto signed my name and affixed my seal, in the presence of two attesting witnesses, at Syracuse, in the county of Onondaga, in the State of New York, this 26th day of January, 1887:

EDGAR PECKHAM. [L. S.]

Witnesses:
C. BENDIXON,
H. P. DENISON.